May 19, 1953 A. W. WARNER, JR 2,639,392

MASKING DEVICE FOR CRYSTALS

Filed Dec. 30, 1949

INVENTOR
A. W. WARNER, JR.
BY
[signature]
ATTORNEY

Patented May 19, 1953

2,639,392

UNITED STATES PATENT OFFICE 2,639,392

MASKING DEVICE FOR CRYSTALS

Arthur W. Warner, Jr., Fanwood, N. J., assignor to Bell Telephone Laboratories, Incorporated, New York, N. Y., a corporation of New York Application December 30, 1949, Serial No. 136,070

5 Claims. (Cl. 310—8.9)

This invention relates to masking devices, and particularly to means for masking a piezoelectric crystal during evaporation coating to frequency.

It is customary in the manufacture of piezoelectric crystals to provide a thin coating of gold or similar material which acts as a conducting layer to transmit the potentials developed during piezoelectric action to and from the circuit in which the crystal is connected. At the higher frequencies it is very difficult to secure an absolutely accurate adjustment to frequency during the preliminary stages of the manufacture of the crystal, inasmuch as the final frequency is affected by even the thin coatings applied, which may be of no more than one micron in thickness. To correct inaccuracies in manufacture, and to permit using a single size of crystal blank for a number of frequencies in the same general region, it is customary to "load" the crystal, that is, to apply a sufficient additional coating over the conducting coating to bring the crystal to the desired frequency. It is desirable to apply this loading coating while the crystal is oscillating, so that continuous frequency measurements may be made, and the application of the coating stopped at precisely the right instant.

Various methods of masking the crystal during such coating to frequency have been used, all of which have been subject to certain limitations in operation. It is difficult to align the mask and crystal accurately so that the coating will be deposited in the precise position desired. If the mask is not close to the crystal surface, irregular spreading of the coating material may occur around the edges of the intended area. This irregular spreading may interfere with the proper operation of the crystal and shift the natural period away from the desired frequency. For example, if the loading coating is allowed to be deposited on the crystal plate outside the conducting coating area, the adherence may be so poor, because of the more rapid technique used in the application of the loading coating as compared with that used in applying the conducting coating, that separation and eventual flaking off, will occur, with a consequent change in frequency. If the loading coating does not coincide with the conducting coating, boundary conditions may be set up which can interfere with the proper operation of the crystal unit, or the static capacitance of the crystal unit may be increased beyond tolerances permissible in interchangeable units. If any of the prior types of masks were to be brought into immediate contact with an oscillating crystal, the frequency would be shifted to an unpredictable degree away from the natural period of vibration, or oscillation might stop entirely.

It is an object of the present invention to provide an improved masking device which will align the area to be loaded accurately with the conducting coating on the crystal.

Another object of the invention is to provide a mask of such configuration that the crystal itself will determine the alignment of the loading coating to be applied.

A further object is to provide a mask which may be applied directly to the crystal while it is in oscillation, without changing the natural period of vibration.

An additional object is the provision of a mask so closely located to a crystal as to eliminate spreading of the coating around the periphery of the masked area.

Still another object of the invention is to improve the technique of producing piezoelectric crystals having desired frequencies of oscillation.

In accordance with this invention a mask is provided which may be applied directly to the crystal, so that the crystal itself determines the alignment of the mask and the location of the coating. This is done while the crystal is oscillating, without significantly changing its frequency, and yet the mask is held close enough to the crystal to prevent spreading of the plating around the edges of the desired area.

The mask comprises a face plate apertured to define the area to be plated, spacing means, and a lip extending over the upper edge of the crystal. This lip hooks over a sufficient portion of the periphery of the crystal to hold the mask snugly in place by cooperating with a spacing shoulder extending from the face plate. This shoulder, and a corresponding shoulder at the bottom of the mask, space the face plate away from the crystal enough to provide clearance between the plate and the crystal leads and coatings.

It has been found that with high frequency crystals of thickness shear type, such as AT cut, the vibration is largely confined to the central area of the crystal, and there is only slight piezoelectric activity at the boundaries. Hence, it is possible to hold the mask in position by engagement with a portion of the crystal periphery, without constraining the crystal against oscillation at its natural frequency. Since the crystal is to be coated while it is oscillating and frequency measurements are being continuously made thereon, the coatings and lead wires should not be shortcircuited by the mask itself. It is, therefore, carefully shaped to provide a proper fit without engaging more than one of the connecting wires or the coatings at the same time.

The invention may be better understood from the following detailed description with reference to the drawings, in which.

Figures 1, 2, 3, 4, 5, 6:
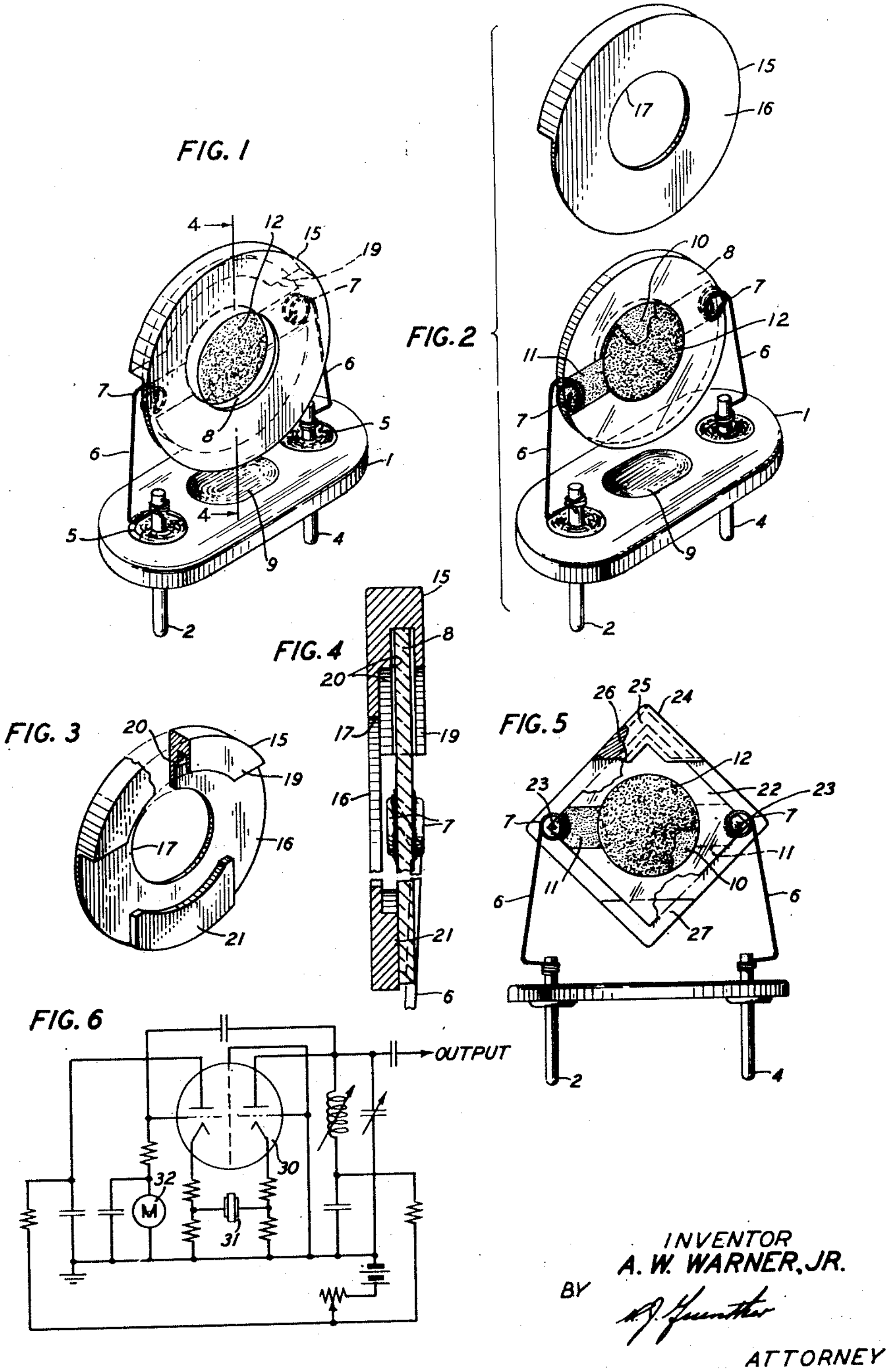
Fig. 1 is a perspective view of a crystal unit with the mask in place thereon as it would be during the coating operation.
Fig. 2 is an exploded view of the assembly shown in Fig. 1, with the mask separated from the crystal unit.
Fig. 3 is a perspective view taken from the side of the mask opposite to that shown in Figs. 1 and 2, and broken away to show details of the lip and upper shoulder.
Fig. 4 is a sectional view taken as indicated by line 4—4 in Fig. 1.
Fig. 5 is a view of another embodiment of the mask for use with square crystal blanks, partially broken away to show its relation to the crystal structure.
Fig. 6 is a schematic diagram exemplary of the test circuit in which the masked crystal is connected for continuous frequency measurements during the coating.

It is to be understood that the embodiments illustrated are exemplary only of the invention, and that it is intended that all variations in the arrangement of the elements, and all equivalent structures and materials for practicing the invention, are intended to be included within the scope of the invention.

Referring now to Fig. 1 of the drawings, there is shown a mask applied to a unit having a thin flat AT-cut quartz crystal blank designed to operate between 15 and 100 megacycles in a sealed container. This crystal is shown in a mounting of the type disclosed in the United States Patent No. 2,392,429 to R. A. Sykes which includes a metal base 1 through which are secured connecting pins 2 and 4. Each of the pins is insulated from the base by a glass bead 5 or equivalent insulating, e. g. ceramic, material. Resilient mounting wires 6 extend upwardly from each of the pins 2 and 4, and terminate in helical portions 7, the turns of which are spread axially of the helix to receive the crystal blank 8 and hold it resiliently therebetween. Base 1 may be recessed at 9 to provide greater clearance for the crystal blank 8. The unit is completed by the addition of a cover, not shown in the drawings, which is soldered to the base 1, evacuated, and hermetically sealed, so that the entire assembly is protected from adverse climatic conditions. In some cases the unit is filled with an inert gas.

The crystal blank shown is provided with a round central conducting coating 10 which extends as a connection tab 11 to the periphery of the crystal. Tab 11 is engaged by the helical portion 7, and is firmly connected thereto, by means such as the silver-Bakelite technique described in the Sykes patent referred to above, to insure good electrical conection. The adjustment of the crystal to precise frequency by means of a loading coating 12 evaporated onto the central coating area 10 is then accomplished with the aid of the mask 15, which is applied directly to, and exactly positioned by, the crystal blank 8.

Mask 15, as seen in detail more clearly in Figs. 2 and 3, comprises a masking plate 16, usually slightly greater in diameter than the crystal to be coated, and apertured centrally at 17 to define the area to which the loading coating is to be applied. The mask is preferably formed of an easily machined metal such as brass, but could be formed of any other heat-resistant material susceptible of careful dimensioning. The mask 15 is supported on the crystal 8 by a lip 19 which extends over an annular segmental area sufficient to hold the mask in place on the crystal, but not great enough to allow the lip to engage both the helical portions 7 at the same time. The blank 8 is spaced away from the masking plate 16 sufficiently to enable it to prevent it from touching the helical portions 7 by means of a shoulder 20 extending from the masking plate 16 substantially congruently with the lip 19. Shoulder 20 engages the upper periphery of the crystal face to which coating is being applied through the mask and is assisted by a corresponding lower shoulder 21 at the bottom of the plate in maintaining the spacing relative to helical portions 7. The separation between shoulder 20 and lip 19 is sufficient to accommodate crystals of thicknesses varying, in a specific embodiment, from .166 to .332 millimeter. The lip 19 covers a segment adequate to hold crystals within this thickness range against the lower shoulder 21 during the plating operation. The central angle subtended by the lip 19 and the shoulder 20 is, however, small enough so that if the mask is rotated about the central axis normal to the crystal face, the shoulder and lip may engage one or the other of the helical portions 7, but not both at the same time. Hence, there is no danger of the mask shorting the crystal. Slightly smaller clearances could be provided if the mask were formed of insulating material. The thickness of the shoulders 20 and 21 is carefully determined to give sufficient clearance for the helical portions 7, without spacing the masking plate 16 from the face of the blank 8 so far that spreading of the coating around the edges of the apertured portion 17 will occur. The supporting wires 6 and helical portions 7 are of the order of .003'' to .009'' in diameter in the embodiment illustrated, so that adequate clearance may be obtained without spacing the masking plate far enough from the blank to interfere with the sharp definition of the loaded area, by the use of a thickness of .012'' for shoulders 20 and 21.

Since the crystal blank itself determines the position of the apertured portion 17, it will be seen that as long as the conducting coating 10 has been properly positioned, the loading plating is automatically limited to an area properly aligned therewith.

The masking device described is not limited to use with round crystals, but may be utilized with any other shape of crystal having characteristics such that edge vibration is at a minimum. The shape of crystal used will determine general configuration of the mask. An exemplary embodiment is shown in Fig. 5, in which the mask is applied to a square crystal blank 22. Blank 22 has a round central conducting coating 10 on each side, with conducting tabs 11 extending toward diagonally opposite corners 23. Tabs 11 are engaged by resilient helical portions 7 formed on supporting wires 6, similar to those in the embodiment of Figs. 1 and 2. Helical portions 7 are preferably cemented to the tabs 11. The mask 24 is square, and is supported by a lip 25 which extends over the upper sides of the blank 22. Spacing shoulder 26 cooperates with lip 25 to hold the mask on the blank, and with a spacing shoulder 27 disposed at the bottom corner of the blank to keep the mask parallel to the crystal face.

With the mask in place and the crystal connected in the test circuit the load coating is applied through the aperture in the mask.

The application is conveniently carried out in connection with a conventional crystal-coating oven, not shown in the drawings, in which a source of coating material, such as gold, is evaporated onto the crystal by energizing a heating filament in an evacuated oven at controlled temperatures.

A schematic circuit diagram of a cathode-coupled oscillator of conventional type for use in connection with the coating operation for which this mask is designed, is shown in Fig. 6. A double triode 30 is arranged to form a cathode-coupled oscillating circuit, with the crystal 31 connected between the two cathodes. An indicating device such as meter 32 is used to show when the crystal is oscillating properly, and the output is then fed to a circuit, not shown, of conventional type for measuring frequency. The output is compared with a frequency standard by the conventional null method or by using a direct indicating frequency meter in the output of the beating circuit. Thus, the point at which the desired frequency has been obtained may be observed directly and coating stopped immediately upon reaching that point.

It may thus be seen that by the use of the masking embodiments here presented, crystals may be calibrated to the exact frequency desired without adverse effect upon the crystal unit performance while the coating operation is continuing. No adjustments will need to be made thereafter for differences caused by subjecting the crystal to external restraining influences, nor will allowances have to be made for inaccuracies in other parts of the manufacturing process, since the end frequency is directly measured, and coating stopped at exactly the desired point. Manufacture is simplified by eliminating problems relating to the alignment of the mask with the crystal plate.

What is claimed is:

1. A self-aligning mask for use during the coating to frequency of a piezoelectric crystal having spaced supporting leads for connection to coatings of opposite polarity, said leads having portions engaging a common surface of said crystal, said mask comprising a masking plate at least coextensive laterally with said crystal, shoulder portions extending from said plate to space said plate away from said crystal and having an extent normal to said crystal greater than that of said lead portions, and a lip, restricted in extent to prevent engaging more than one of said lead portions simultaneously, projecting from said plate over a portion of the periphery of said crystal adjacent one of said shoulder portions.

2. A device for the masking of a piezoelectric crystal having leads connected thereto during evaporation coating to frequency, which comprises a conductive masking plate disposable between a source of evaporating metal and said crystal, a supporting member secured to said masking plate adapted for engagement with the periphery of said crystal, and a spacing member secured to said masking plate and adapted to contact said crystal and maintain clearance between said masking plate and said crystal and leads to prevent short-circuiting the said crystal during coating.

3. A device for masking a piezoelectric crystal supported by connecting leads during evaporation coating to frequency, comprising a masking plate apertured to define an area to be plated therethrough, spacing elements so disposed about the periphery of said plate as to prevent simultaneous contact with more than one of said connecting leads during coating, and means including a lip formed integrally with said masking plate for securing spaced engagement between said plate and said crystal.

4. In a masking device for use during the evaporation coating to frequency of piezoelectric crystals having connecting leads secured thereto, the combination of a flat annular masking plate defining the area to be plated therethrough, means including separated spacing shoulders disposed adjacent the periphery of said plate for preventing simultaneous contact of said plate with more than one of said leads to said crystal, and self-aligning means for holding said mask on said crystal, including an annular lip extending over portions of the periphery of the said crystal, and engaging the peripheral portion thereof opposite that engaged by said spacing shoulders.

5. In a device for masking during evaporation coating to frequency of square piezoelectric crystals having connecting means disposed at diagonally opposite corners thereof, the combination of a square, apertured masking plate, upper and lower spacing shoulders disposed at diagonally opposite corners of said plate and arranged to engage said crystal peripherally intermediate those of said corners associated with said connecting means, and a lip extending from said upper spacing shoulders for engagement with the periphery of the crystal face opposite that to be engaged by said shoulders.

ARTHUR W. WARNER, Jr.

References Cited in the file of this patent

UNITED STATES PATENTS

| Number | Name | Date |
|---|---|---|
| 1,664,402 | Dewey | Apr. 3, 1928 |
| 1,781,258 | Walker | Nov. 11, 1930 |
| 2,106,143 | William | Jan. 18, 1938 |
| 2,161,030 | Fischer | June 6, 1939 |
| 2,349,163 | Gibbs | May 16, 1944 |
| 2,356,883 | Prue | Aug. 29, 1944 |
| 2,428,043 | Searle | Sept. 30, 1947 |
| 2,462,899 | Riecken | Mar. 1, 1949 |
| 2,470,737 | Bach | May 17, 1949 |
| 2,505,370 | Sykes | Apr. 25, 1950 |

OTHER REFERENCES

Sykes, "High Frequency Plated Quartz Crystal Units," Proc. I. R. E. Decimal Classification R. 214.3, December 26, 1946.